United States Patent [19]
Takahashi

[11] Patent Number: 6,019,219
[45] Date of Patent: Feb. 1, 2000

[54] SLEEVE-TYPE CARTRIDGE CASES

[75] Inventor: Kenji Takahashi, Miyagi, Japan

[73] Assignee: Sony Corporation, Japan

[21] Appl. No.: 09/123,514

[22] Filed: Jul. 28, 1998

[30] Foreign Application Priority Data

Jul. 31, 1997 [JP] Japan .................................... 9-205808

[51] Int. Cl.[7] .......................... B65D 85/57; B65D 85/671
[52] U.S. Cl. ....................... 206/387.1; 206/307; 220/4.21
[58] Field of Search ................................. 206/303, 308.1, 206/308.3, 312, 313, 387.1; 220/4.21, 4.24

[56] References Cited

U.S. PATENT DOCUMENTS 4,838,422  6/1989  Gregerson ................................ 206/444

FOREIGN PATENT DOCUMENTS

0 564 155 A2  10/1993  European Pat. Off. .
2 268 473      1/1994  United Kingdom .

*Primary Examiner*—Jim Foster
*Attorney, Agent, or Firm*—Rader, Fishman & Grauer; Ronald P. Kananen

[57] ABSTRACT

A sleeve-type cartridge case includes an upper half, a lower half connected thereto, a connecting protrusion arranged on each side plate of the upper half, and a connecting concavity arranged in each side plate of the lower half. The connecting protrusion is engaged with the connecting concavity when placing the upper half on the lower half. An amount of engagement of the connecting protrusion and concavity is larger than a difference between a width of a cartridge and a distance between two of the side plates of the upper and lower halves which are positioned inside.

12 Claims, 10 Drawing Sheets

SLEEVE-TYPE CARTRIDGE CASES

BACKGROUND OF THE INVENTION

The present invention relates to sleeve-type cases for accommodating recording mediums or cartridges for discs or tapes.

Figure 11:
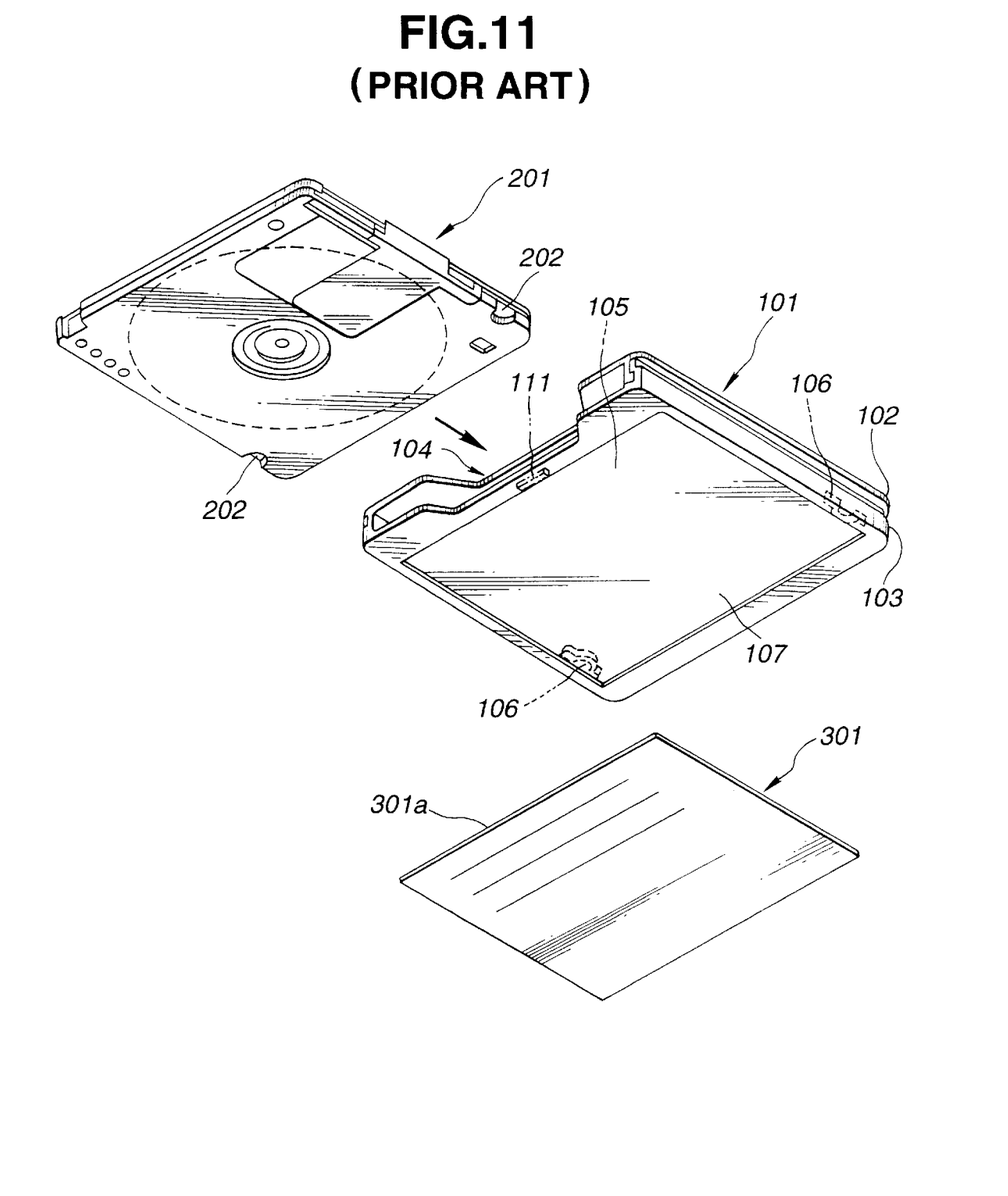
FIG. 11 is a view similar to FIG. 5, showing a known cartridge case with a disc cartridge.

Referring to FIG. 11, a known sleeve-type cartridge case 101 is formed like a flat box by connecting upper and lower halves 102, 103. The cartridge case 101 has a cartridge compartment 105 which can receive a disc cartridge 201 through an opening 104 formed in an end face.

The cartridge case 101 includes a pair of resilient cartridge locking members 106 arranged on inner side faces of the cartridge compartment 105.

When inserting the disc cartridge 201 into the cartridge compartment 105 through the opening 104, the pair of cartridge locking members 106 is engaged with a pair of clamping concavities 202 arranged in side faces of the disc cartridge 201, locking the disc cartridge 201 in the accommodated state.

The lower half 103 includes at the bottom a concavity 107 for placing an index card 301.

With such known cartridge case 101, however, the index card 301 is adhered to the bottom of the lower half 103, so that when replacing the index card 301 with a new one, the old index card 301 should be stripped off from the bottom of the lower half 103.

In view of this, without being adhered to the bottom of the lower half 103, the index card 301 can be inserted and arranged in the cartridge compartment 105 together with the disc cartridge 101. However, the index card 301 arranged in the cartridge compartment 105 in such a simple way may fall out of the cartridge compartment 105 together with the disc cartridge 201 when it is removed from the cartridge compartment 105.

Such a drawback can be solved by arranging in the cartridge compartment 105 an anti-falling stopper in the form of a card engaging protrusion 111 as shown by two-dot chain line in FIG. 11, with which one end 301a of the index card 301 is engaged. However, when taking out the index card 301 to rewrite a description thereon or replacing the index card 301 with a new one, disengagement of the one end 301a of the index card 301 with the card engaging protrusion 111 is not carried out easily.

It is, therefore, an object of the present invention to provide sleeve-type cartridge cases which enable sure arrangement and easy removal of an index card in and from a cartridge compartment.

SUMMARY OF THE INVENTION

One aspect of the present invention lies in providing a case for accommodating a recording medium with an index card, the case having an opening at one end thereof, the case comprising:

a first half, said first half comprising a main portion and side portions arranged on both sides of said main portion;

a second half connected to said first half, said second half comprising a main portion and side portions arranged on both sides of said main portion, said side portions of said second half being arranged adjacent to said side portions of said first half;

a first engagement arranged with each of said side portions of said first half; and a second engagement arranged with each of said side portions of said second half, said second engagement being engaged with said first engagement when placing said first half on said second half, an amount of engagement of said first and second engagements being larger than a difference between a width of the recording medium and a distance between two of said side portions of said first and second halves which are positioned inside.

Another aspect of the present invention lies in providing a case for accommodating a recording medium with an index card, the case having an opening at one end thereof, the case comprising:

a first half, said first half comprising a main portion and side portions arranged on both sides of said main portion;

a second half connected to said first half, said second half comprising a main portion and side portions arranged on both sides of said main portion, said side portions of said second half being arranged adjacent to said side portions of said first half;

a first engagement arranged with each of said side portions of said first half;

a second engagement arranged with each of said side portions of said second half, said second engagement being engaged with said first engagement when placing said first half on said second half, an amount of engagement of said first and second engagements being larger than a difference between a width of the recording medium and a distance between two of said side portions of said first and second halves which are positioned inside;

a third engagement arranged with each of said side portions of said first half, said third engagement extending from the one end of the case to another end;

a fourth engagement arranged with each of said side portions of said second half, said fourth engagement extending from the one end to said another end, said fourth engagement being engaged with said third engagement;

a protrusion arranged with said main portion of said second half, said protrusion being engaged with an end of the index card disposed on said main portion of said second half; and an inclined face arranged with said second half at the one end of the case, said inclined face being continuously connected to an upper side of said protrusion.

DETAILED DESCRIPTION OF THE INVENTION

Referring to the drawings wherein like reference numerals designate like parts throughout the views, a description will be made with regard to a sleeve-type cartridge case embodying the present invention.

FIGS. 1–9 show a first embodiment of the present invention wherein a sleeve-type cartridge case 1 serves to accommodate a disc cartridge 201. The cartridge case 1 is formed like a flat box by connecting upper and lower halves 2, 3 made of a synthetic resin. When inserting the disc cartridge 201 into a cartridge compartment 5 through an opening 4 formed in an end face, a pair of cartridge locking members 6 arranged on inner side faces of the cartridge compartment 5 is engaged with a pair of clamping concavities 202 arranged in side faces of the disc cartridge 201, holding the disc cartridge 201 in the cartridge compartment 5.

Referring to FIGS. 2–5, the upper half 2 is formed like a square, comprising a top plate 22 having at a front end a substantially circular recess 21 which is useful when removing the disc cartridge 201, side plates 23, 24 arranged on both sides of the top plate 22, and a rear plate 25 arranged at a rear end of the top plate 22.

The cartridge locking members 6 are integrated with the side plates 23, 24, and are formed resiliently by partly recessing the side plates 23, 24.

The lower half 3 is formed like a square in the same way as the upper half 2, comprising a bottom plate 32 having at a front end a substantially circular recess 31 which is useful when removing the disc cartridge 201, side plates 33, 34 arranged on both sides of the bottom plate 32, and a rear plate 35 arranged at a rear end of the bottom plate 32. The lower half 3 is formed transparently out of a styrene or polycarbonate resin.

The side plates 23, 24 and the rear plate 25 of the upper half 2 are arranged adjacent to the inner surfaces of the side plates 33, 34 and the rear plate 35 of the lower half 3.

Figure 6:
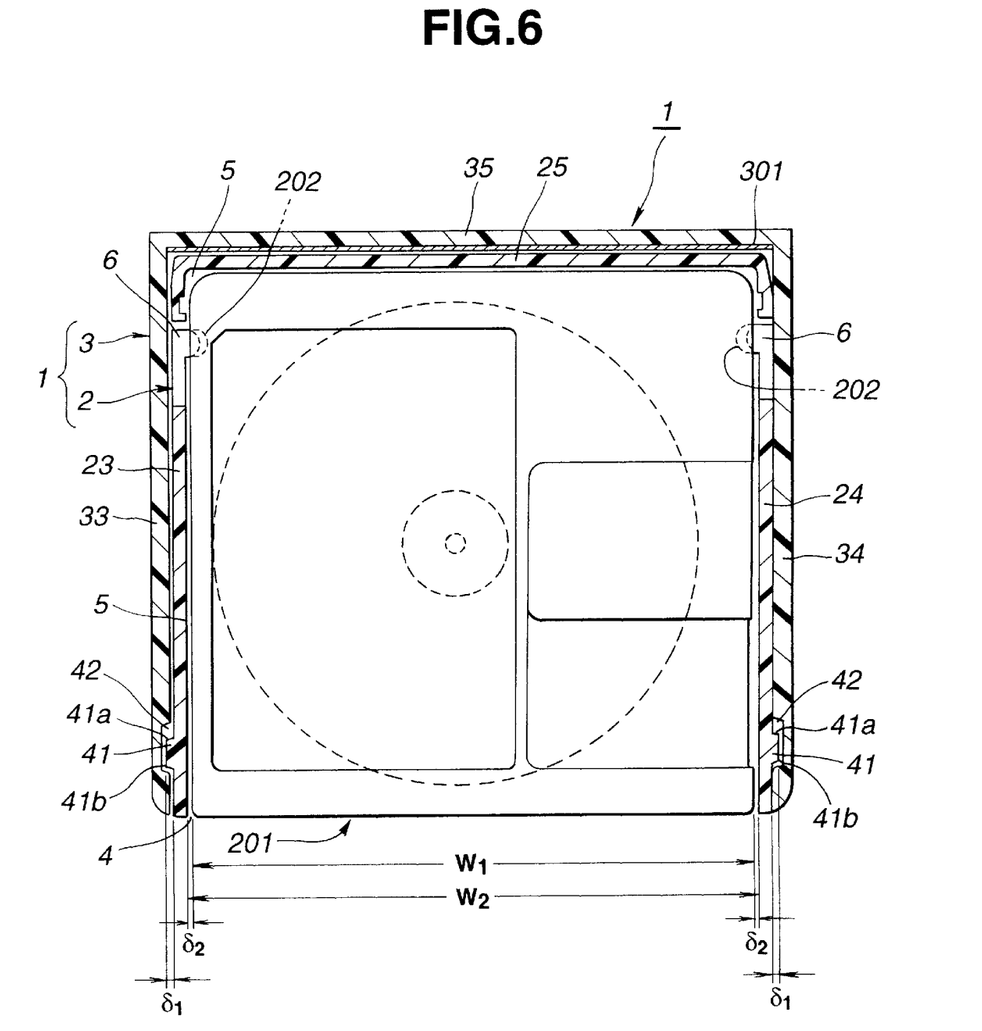
FIG. 6 is a plane section showing the disc cartridge.

Referring to FIG. 6, the side plates 23, 24 of the upper half 2 are formed with connecting protrusions 41, whereas the side plates 35 of the lower half 3 are formed with connecting concavities 42. When placing the upper half 2 on the lower half 3, the connecting protrusions 41 and concavities 42 are engaged with each other to detachably connect the upper and lower halves 2, 3.

A combined amount ($\delta_1+\delta_1$) of engagement depth of the connecting concavity 41 and protrusion 42 is determined to be larger than a difference ($\delta_2+\delta_2$) between a width $W_1$ of the disc cartridge 201 accommodated in the cartridge compartment 5 and a distance $W_2$ between the side plates 23, 24 of the upper half 2.

Figure 1:
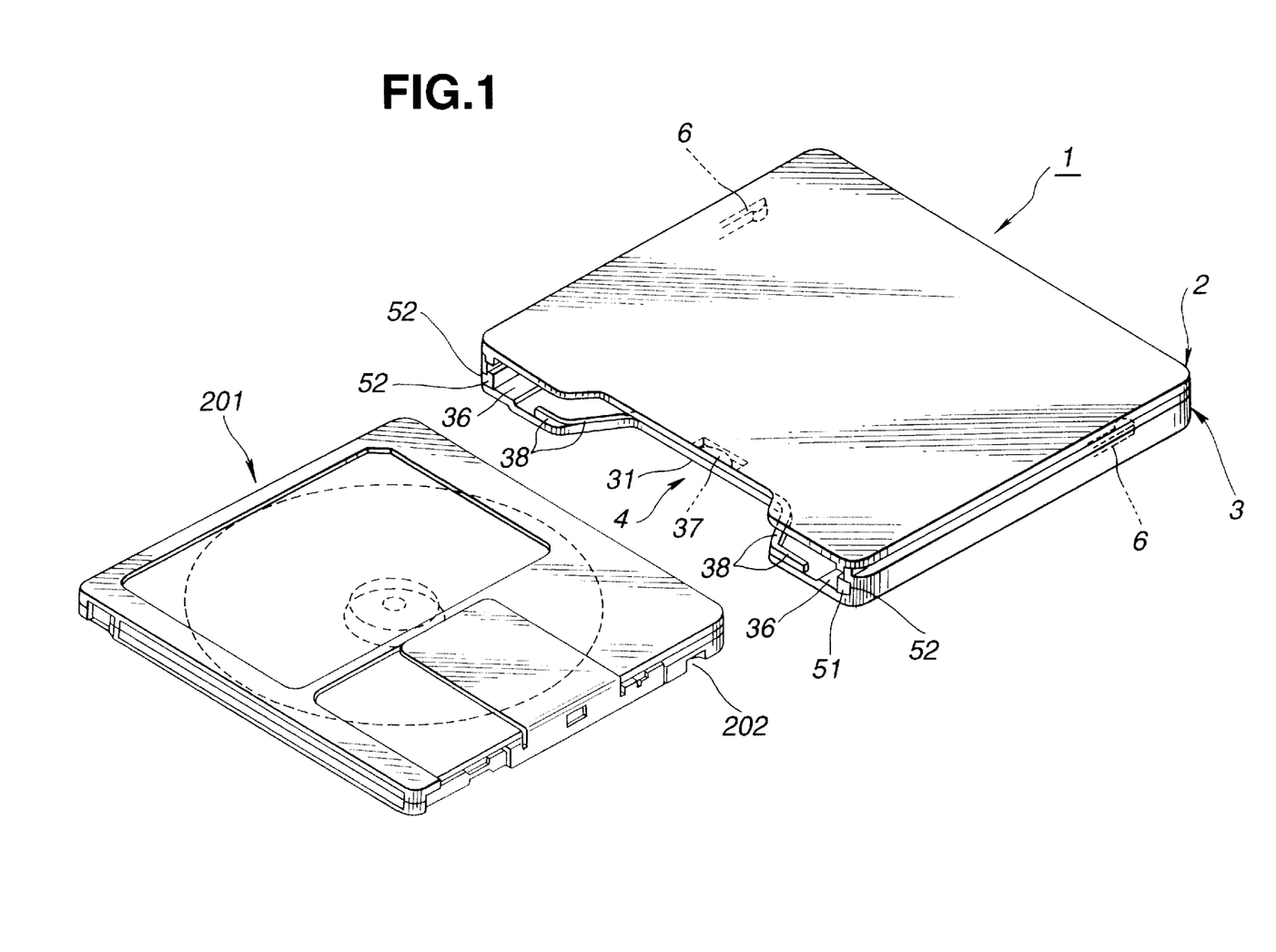
FIG. 1 is a perspective view showing a first embodiment of a sleeve-type cartridge case with a disc cartridge.
Figure 2:
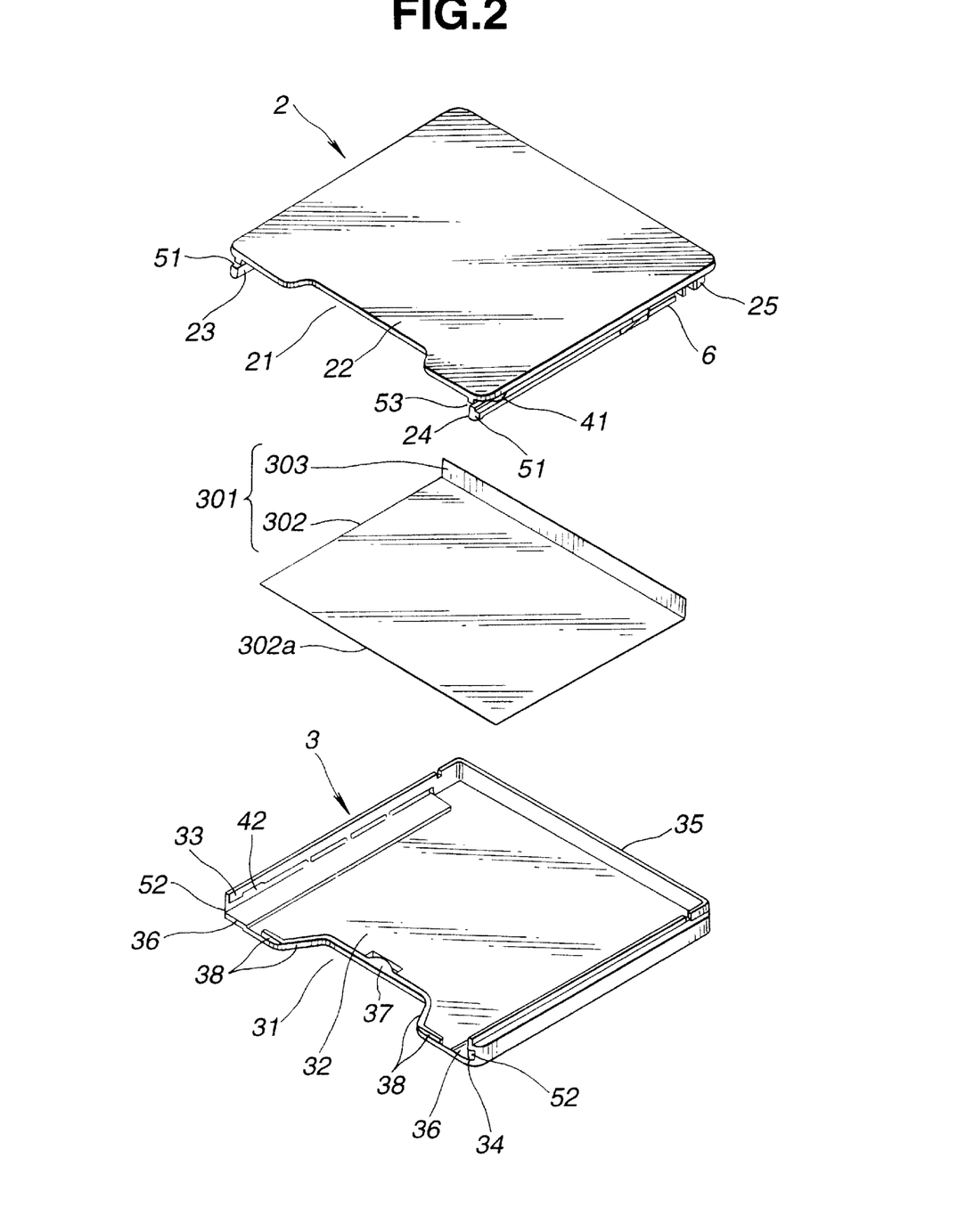
FIG. 2 is an exploded perspective view showing the cartridge case.
Figure 4:
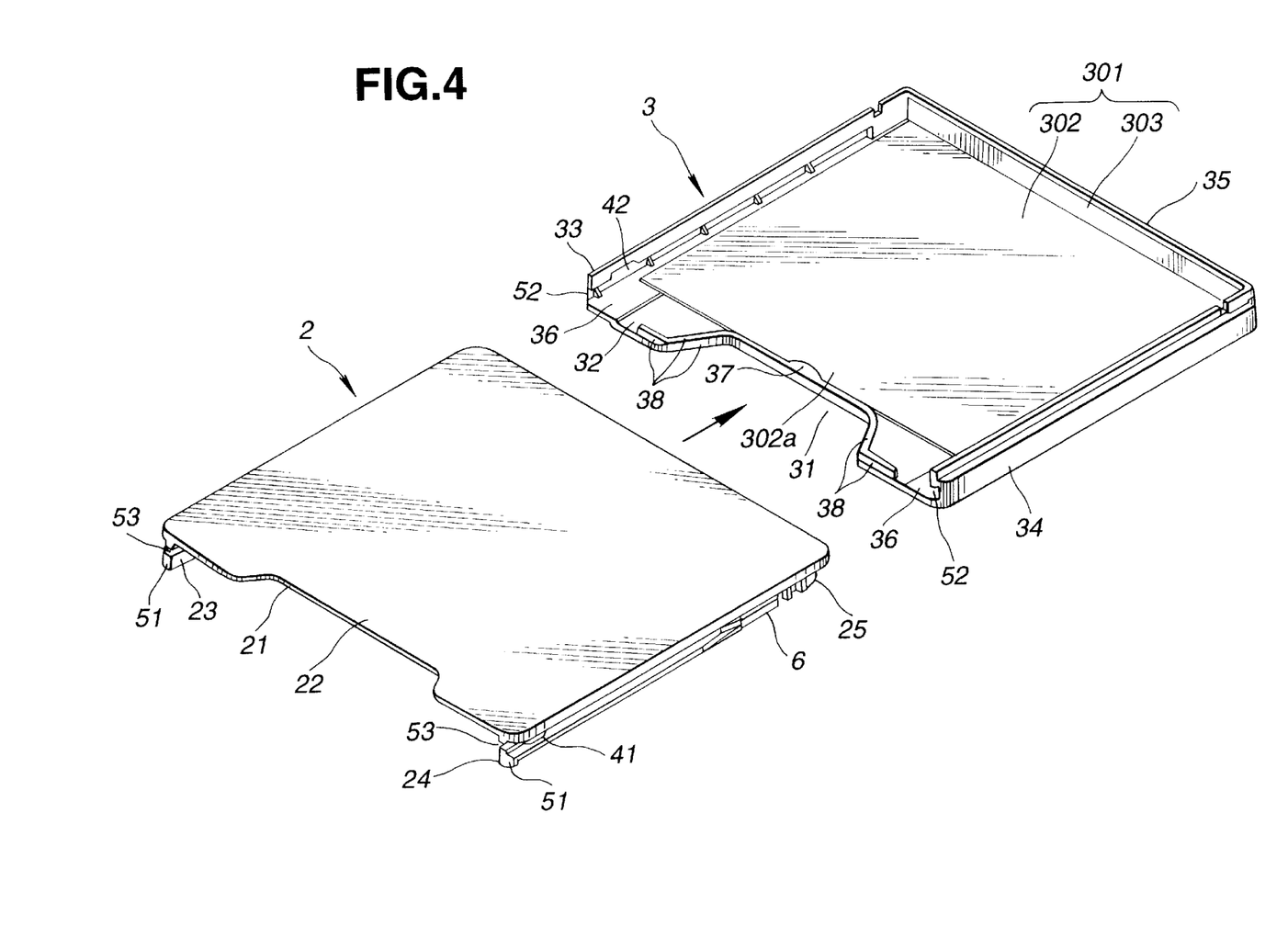
FIG. 4 is a view similar to FIG. 3, showing the upper and lower halves of the cartridge case.
Figure 5:
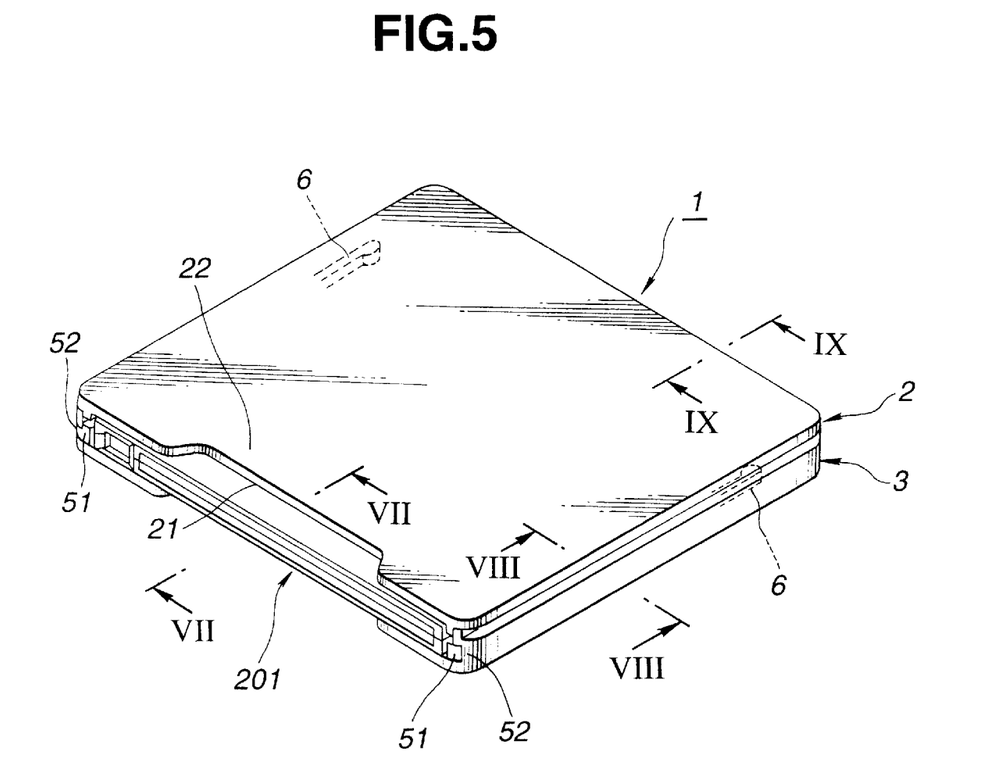
FIG. 5 is a view similar to FIG. 4, showing the cartridge case with the disc cartridge accommodated therein.
Figure 9:
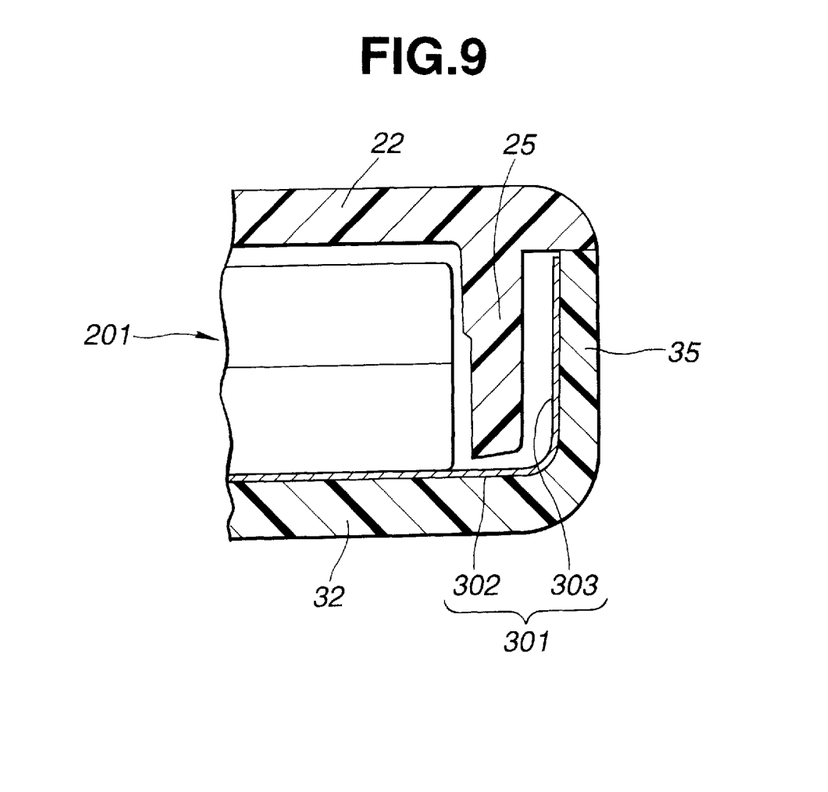
FIG. 9 is a sectional view taken along the line IX—IX in FIG. 5.

Referring to FIGS. 2, 4, and 9, an index card 301 is disposed on the bottom plate 32 of the lower half 3. The index card 301 has a main surface 302 disposed on stepped portions 36 arranged on both sides of the bottom plate 32 of the lower half 3, and a rear surface 303 connected substantially perpendicularly to one end of the main surface 302 and arranged adjacent to the inner surface of the rear plate 35 of the lower half 3.

The lower half 3 has a card engaging protrusion 37 which is engaged with one end 302a of the main surface 302 of the index card 301 to prevent the index card 301 from separating from the bottom plate 32 and falling from the opening 4.

Figure 7:
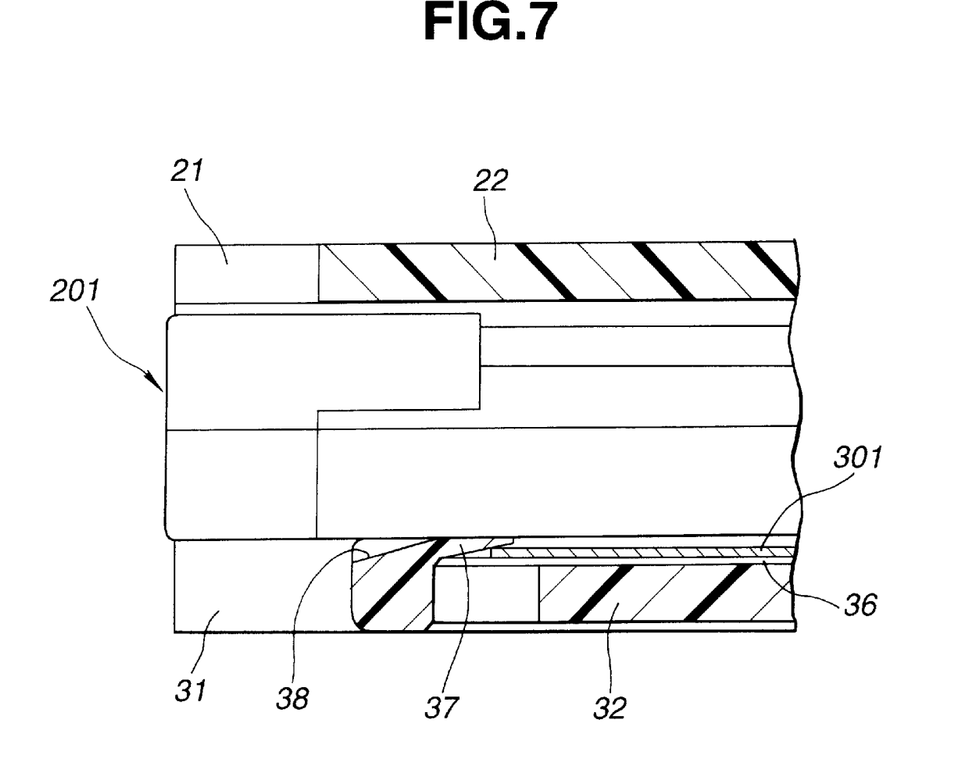
FIG. 7 is a sectional view taken along the line VII—VII in FIG. 5.

Referring to FIGS. 2 and 7, the lower half 3 has an inclined face 38 continuously connected to the upper side of the card engaging protrusion 37, by which the disc cartridge 201 can smoothly be inserted into the cartridge compartment 5 through the opening 4. Without the inclined face 38, smooth insertion of the disc cartridge 201 cannot be obtained when contacting an end face of the card engaging protrusion 37.

Figure 8:
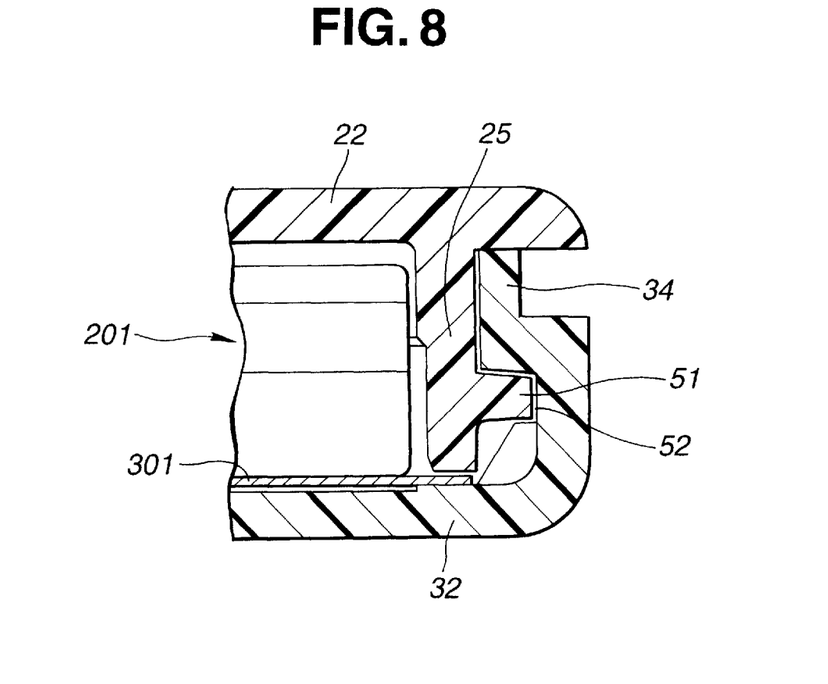
FIG. 8 is a sectional view taken along the line VIII—VIII in FIG. 5.

Referring to FIGS. 4 and 8, a rail-like or track-like protrusion 51 is arranged at a lower end of the outer side face of the side plate 23, 24 of the upper half 2 to extend from an end on the side of the opening 4 to the rear plate 25, whereas a rail-like or track-like concavity 52 is arranged in the inner side face of the side plate 33, 34 of the lower half 3 to extend from an end on the side of the opening 4 to the rear plate 35. When inserting ends of the protrusions 51 on the side of the rear plate 25 into ends of the concavities 52 on the side of the opening 4 to slide the protrusions 51 along the concavities 52, the upper and lower halves 2, 3 can vertically be placed one upon another.

The connecting protrusion 41 is arranged at the end of the outer side face of the side plate 23, 24 of the upper half 2 on the side of the opening 4, whereas the connecting concavity 42 is arranged at the end of the inner side face of the side plate 33, 34 of the lower half 3. As described above, when engaging the rail-like protrusions 51 and concavities 52 with each other to slide the protrusions 51 along the concavities 52, the connecting protrusion 41 and concavity 42 are engaged with each other, obtaining the upper and lower halves 2, 3 vertically placed one upon another and engaged with each other.

Figure 3:
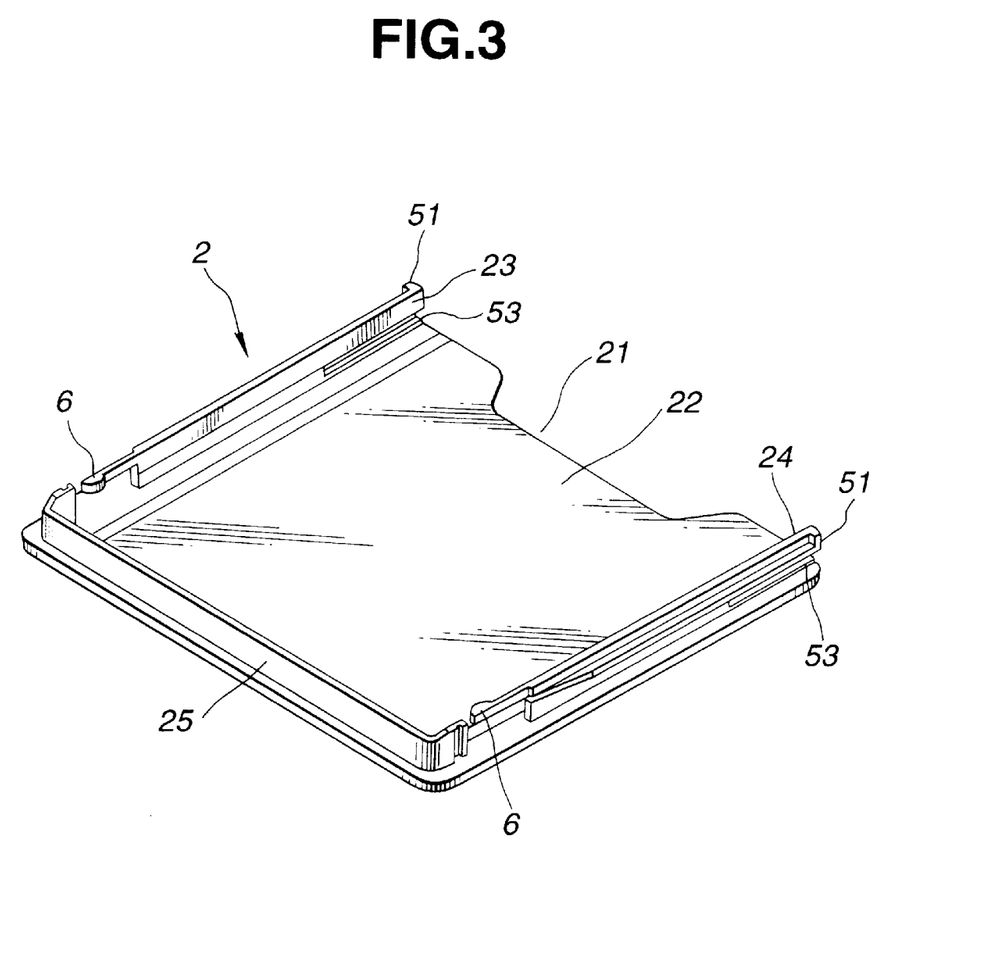
FIG. 3 is a view similar to FIG. 1, showing an upper half of the cartridge case placed upside down.

As best seen in FIG. 3, a slit-like recess 53 is arranged in the side plate 23, 24 of the upper half 2 to extend from the end on the side of the opening 4 to the connecting protrusion 41. The slit-like recess 53 serves to provide resiliency to the connecting protrusion 41 for easy bend thereof. Referring to FIG. 6, both ends 41a, 41b of the connecting protrusion 41 are slantly formed in the slide direction to enable easy engagement/disengagement of the connecting protrusion 41 with/from the concavity 42.

In the first embodiment, the cartridge case 1 is constructed as described above. Referring to FIG. 4, upon assembling of the cartridge case 1, the rear surface 303 of the index card 301 is put on the inner surface of the rear plate 35 of the lower half 3 to place the main surface 302 of the index card 301 on the bottom plate 32 of the lower half 3. The one end 302a of the main surface 302, i.e. an opposite end to the rear surface 303, is engaged with the card engaging protrusion 37.

Then, the rail-like protrusions 51 arranged on the outer side faces of the side plates 23, 24 of the upper half 2 are engaged with the rail-like concavities 52 arranged in the inner side faces of the side plates 33, 34 of the lower half 3 to slide the protrusions 51 along the concavities 52. This achieves the upper and lower halves 2, 3 vertically placed one upon another, and the connecting protrusions 41 engaged with the connecting concavities 42, obtaining the cartridge case 1 assembled. When inserting the disc cartridge 201 into the cartridge case 1, the cartridge locking members 6 are engaged with the clamping concavities 202 arranged on both sides of the disc cartridge 201, holding the disc cartridge 201 in the cartridge compartment 5.

When rewriting or adding a description on the index card 301 or replacing the index card 301 with a new one, the disc cartridge 201 is removed from the cartridge compartment 5, then the upper and lower halves 2, 3 are slid in the direction opposite to that upon assembling. By this, the upper and lower halves 2, 3 are separated to enable easy removal of the index card 301 from the lower half 3.

Figure 10:
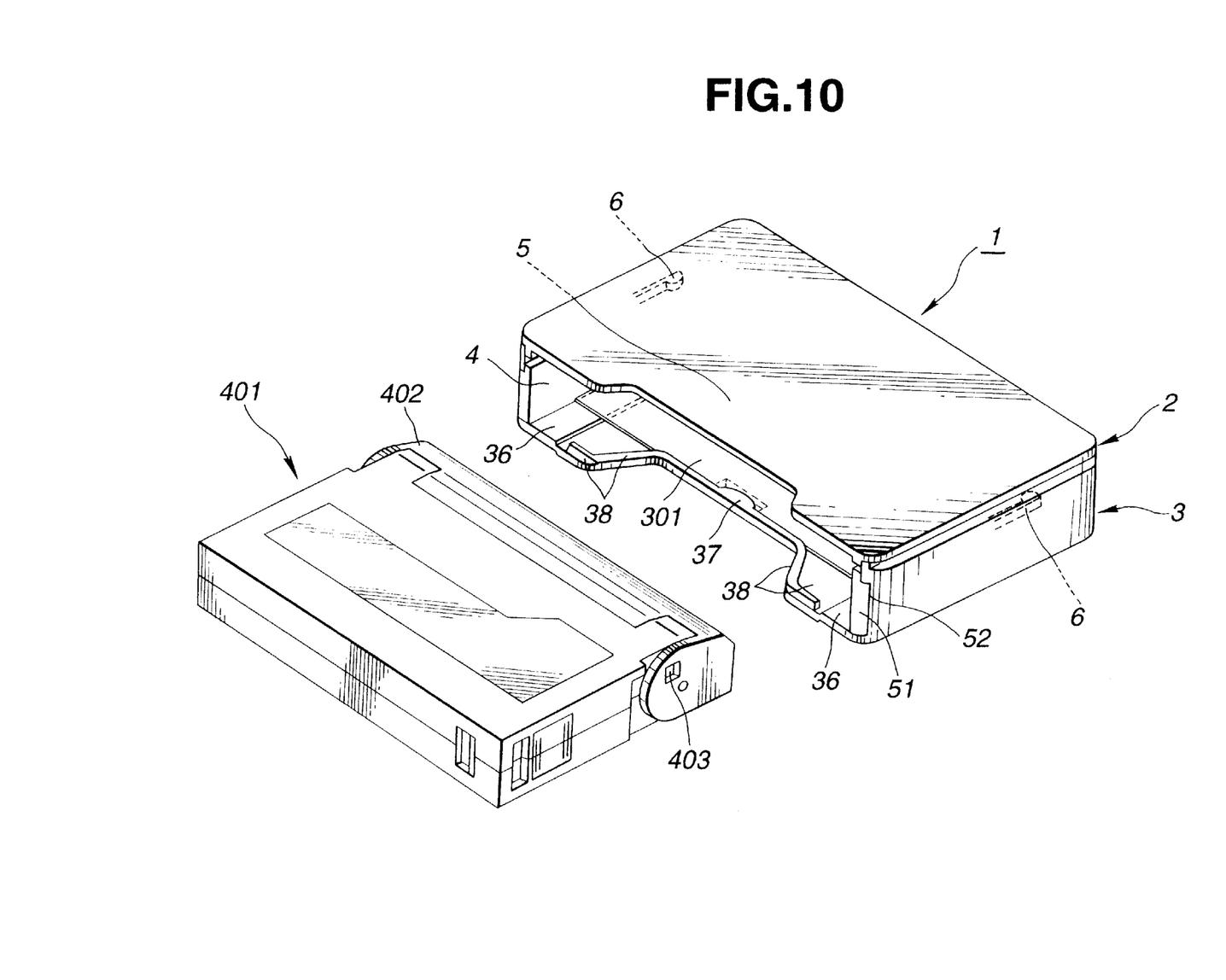
FIG. 10 is a view similar to FIG. 5, showing a second embodiment of the present invention.

FIG. 10 shows a second embodiment of the present invention wherein a sleeve-type cartridge case 1 serves to accommodate a tape cartridge 401. It is noted that the second embodiment is substantially the same in structure as the first embodiment except that the cartridge case 1 is formed in accordance with the size of the tape cartridge 401. When inserting the tape cartridge 401 into the cartridge case 1, cartridge locking members 6 are engaged with tape-end detecting holes 403 arranged on both sides of a lid 402 of the tape cartridge 401 to hold the tape cartridge 401 in a cartridge compartment 5.

Having described the present invention with regard to the preferred embodiments, it is noted that the present invention is not limited thereto, and various changes and modifications can be made without departing from the scope of the present invention.

By way of example, in the embodiments, the side plates 23, 24 of the upper half 2 are arranged adjacent to the inner side faces of the side plates 33, 34 of the lower half 3. Alternatively, the side plates 23, 24 of the upper half 2 may be arranged adjacent to the outer side faces of the side plates 33, 34 of the lower half 3.

Further, in the embodiments, the connecting protrusions 41 are arranged on the side plates 23, 24 of the upper half 2, whereas the connecting concavities 42 are arranged in the side plates 33, 34 of the lower half 3. Alternatively, the connecting protrusions 41 may be arranged on the lower half 3, whereas the connecting concavities 42 may be arranged in the upper half 2.

Furthermore, the upper and lower halves 2, 3 may be vertically slidable for connection of the two.

What is claimed is:

1. In combination, a case accommodating a recording medium with an index card, the case having an opening at one end thereof, the case comprising:
    a first half, said first half comprising a main portion and side portions arranged on both sides of said main portion;
    a second half connected to said first half, said second half comprising a main portion and side portions arranged on both sides of said main portion, said side portions of said second half being arranged adjacent to said side portions of said first half;
    a first engagement disposed on each of said side portions of said first half; and
    a second engagement disposed on each of said side portions of said second half, wherein said second engagements are engaged with said first engagements to a combined depth of engagement which is larger than a difference between a width of the recording medium and a distance between two of said side portions of said first and second halves which are positioned inside, and said first and second engagements are arranged to prevent said first and second halves from being separated while the recording medium is accommodated within the case.

2. The combination as claimed in claim 1, wherein said first engagement is in the form of a protrusion, and wherein said second engagement is in the form of a concavity.

3. The combination as claimed in claim 1, wherein said protrusions each has resiliency given by a recess formed in each of said side portions of said first half.

4. The combination as claimed in claim 1, wherein said depth of engagement is parallel to the width of the recording medium.

5. A case for accommodating a recording medium with an index card, the case having an opening at one end thereof, the case comprising:
    a first half, said first half comprising a main portion and side portions arranged on both sides of said main portion;
    a second half connected to said first half, said second half comprising a main portion and side portions arranged on both sides of said main portion, said side portions of said second half being arranged adjacent to said side portions of said first half;
    a first engagement disposed on each of said side portions of said first half; and
    a second engagement disposed on each of said side portions of said second half, said first engagements being engaged with said second engagements to a depth of engagement sufficient to prevent said first and second halves from separating; and
    a protrusion disposed on said main portion of said second half, said protrusion being engaged with an end of the index card disposed on said main portion of said second half.

6. A case as claimed in claim 5, further comprising:
    an inclined face disposed on said second half at the one end of the case, said inclined face being continuously connected to an upper side of said protrusion.

7. A case as claimed in claim 6, further comprising:
    a third engagement disposed on each of said side portions of said first half, said third engagement extending from the one end of the case to another end; and
    a fourth engagement disposed on each of said side portions of said second half, said fourth engagement extending from the one end to said another end, said fourth engagement being engaged with said third engagement.

8. A case as claimed in claim 7, wherein said third engagement is in the form of a rail-like protrusion, whereas said fourth engagement is in the form of a rail-like concavity.

9. A case as claimed in claim 5, wherein said second half is made of a transparent synthetic resin.

10. A case for accommodating a recording medium with an index card, the case having an opening at one end thereof, the case comprising:
    a first half, said first half comprising a main portion and side portions arranged on both sides of said main portion;
    a second half connected to said first half, said second half comprising a main portion and side portions arranged on both sides of said main portion, said side portions of said second half being arranged adjacent to said side portions of said first half;
    a first engagement disposed on each of said side portions of said first half;
    a second engagement disposed on each of said side portions of said second half, said second engagements being engaged with said first engagements to a depth sufficient to prevent said first and second halves from separating;
    a third engagement disposed on each of said side portions of said first half, said third engagement extending from the one end of the case to another end;
    a fourth engagement disposed on each of said side portions of said second half, said fourth engagement extending from the one end to said another end, said fourth engagement being engaged with said third engagement;

a protrusion disposed on said main portion of said second half, said protrusion being engaged with an end of the index card disposed on said main portion of said second half; and an inclined face disposed on said second half at the one end of the case, said inclined face being continuously connected to an upper side of said protrusion.

11. A case for accommodating a recording medium with an index card, the case having an opening at one end thereof, the case comprising:

a first half, said first half comprising a main portion and side portions arranged on both sides of said main portion;

a second half connected to said first half, said second half comprising a main portion and side portions arranged on both sides of said main portion, said side portions of said first half being arranged adjacent to and between said side portions of said second half, said side portions of said first half defining a space therebetween for accommodating a recording medium;

a first engagement disposed on each of said side portions of said first half;

a second engagement disposed on each of said side portions of said second half;

a third engagement disposed on each of said side portions of said first half, said third engagement extending from the one end of the case to another end;

a fourth engagement disposed on each of said side portions of said second half, said fourth engagement extending from the one end to said another end, said fourth engagement being slidably engaged with said third engagement; and said first engagements are arranged for resilient movement in a direction toward and away from said space, said first engagements being arranged for engagement with said second engagements by resilient movement of said first engagements toward said second engagements in a direction away from said space to prevent relative sliding movement between said third and fourth engagements, and said first engagements being arranged for disengagement from said second engagements by resilient movement of said first engagements toward said space to allow relative sliding movement between said third and fourth engagements.

12. The case as claimed in claim 11, wherein said third engagement is in the form of a rail-like protrusion, and wherein said depth of engagement is parallel to the width of the recording medium.

* * * * *

UNITED STATES PATENT AND TRADEMARK OFFICE
CERTIFICATE OF CORRECTION

PATENT NO.    : 6,019,219
DATED         : February 1, 2000
INVENTOR(S)   : Kenji Takahashi Page 1 of 1

It is certified that error appears in the above-identified patent and that said Letters Patent is hereby corrected as shown below:

<u>Column 8,</u>
Line 20 et seq., claim 12, line 1, should read;
      12. The case as claimed in claim 10, wherein said third engagement is in the form of a rail-like protrusion, and wherein said fourth engagement is in the form of a rail-like concavity.

Signed and Sealed this

Twenty-eighth Day of August, 2001

Attest:

*Attesting Officer*

NICHOLAS P. GODICI
*Acting Director of the United States Patent and Trademark Office*